(12) United States Patent
Tosti et al.

(10) Patent No.: US 8,979,984 B2
(45) Date of Patent: Mar. 17, 2015

(54) MEMBRANE REACTOR FOR TREATING GASES CONTAINING TRITIUM

(75) Inventors: Silvano Tosti, Frascati (IT); Nicolas Ghirelli, St Maximin (FR); Fabio Borgognoni, Iesi (IT); Pierre Trabuc, Venelles (FR); Alessia Santucci, Colonna (IT); Karine Liger, Pertuis (FR); Fabrizio Marini, Frascati (IT)

(73) Assignees: Enea-Agenzia Nazionale per le Nuove Technologie, l'Energia e lo Sviluppo Economico Sostenibile, Rome (IT); Commissariat a l'Energie Atomique et aux Energies Alternatives, Paris (FR)

( * ) Notice: Subject to any disclaimer, the term of this patent is extended or adjusted under 35 U.S.C. 154(b) by 65 days.

(21) Appl. No.: 13/704,706

(22) PCT Filed: Jun. 16, 2011

(86) PCT No.: PCT/IT2011/000205
§ 371 (c)(1),
(2), (4) Date: Jan. 11, 2013

(87) PCT Pub. No.: WO2011/158275
PCT Pub. Date: Dec. 22, 2011

(65) Prior Publication Data
US 2013/0108517 A1    May 2, 2013

(30) Foreign Application Priority Data
Jun. 16, 2010  (IT) .............................. RM2010A0330

(51) Int. Cl.
*B01D 53/22* (2006.01)
*B01D 69/04* (2006.01)
(Continued)

(52) U.S. Cl.
CPC .............. *B01D 69/04* (2013.01); *B01D 53/228* (2013.01); *B01D 59/32* (2013.01); *B01D 63/06* (2013.01);
(Continued)

(58) Field of Classification Search
CPC ...... B01D 53/228; B01D 59/30; B01D 59/32; B01D 63/06; B01D 65/00; B01D 65/003; B01D 69/04; B01D 71/022; B01D 2311/13; B01D 2256/16; B01D 2313/025; B01D 2313/34; C01B 3/505; C01B 4/00; C01B 2203/041; B01J 19/1893; B01J 2219/0286; B01J 2219/0254; H01M 8/0681; H01M 8/0687; H01M 4/94; Y02E 60/50
USPC ............. 96/4, 8, 10; 95/55, 56; 422/187, 211, 422/214, 218
See application file for complete search history.

(56) References Cited

U.S. PATENT DOCUMENTS 4,315,819 A * 2/1982 King et al. .................. 210/321.8
5,376,167 A * 12/1994 Broutin et al. ..................... 96/10
(Continued)

FOREIGN PATENT DOCUMENTS

GB       822 694       10/1959
GB       966 122       8/1964
(Continued)

OTHER PUBLICATIONS

Toshi et al., "Mechanical design of a PERMCAT reactor module", Fusion Engineering and Design, vol. 82, 2007, pp. 153-161.*
(Continued)

*Primary Examiner* — Jason M Greene
(74) *Attorney, Agent, or Firm* — Young & Thompson

(57) ABSTRACT

An apparatus for recovery of tritium from contaminated gaseous mixtures by way of isotope-exchange processes includes a container having a preferably cylindrical shape made of steel or other suitable metal or glass, referred to as "module" (1), which contains at least one permeator tube (T) made of metal or metal alloy selectively permeable to hydrogen and its isotopes, wherein the tube (T) is set in cantilever fashion with its free end closed, there being further provided elements for applying an axial tensile force on the free end of the permeator tube (T) and elements for electrical connection of the free end of the tube (T) to an end flange (FF) of the module (1) adjacent thereto.

10 Claims, 4 Drawing Sheets

(51) Int. Cl.
*B01D 59/32* (2006.01)
*B01D 63/06* (2006.01)
*B01D 65/00* (2006.01)
*B01D 71/02* (2006.01)
*B01J 19/18* (2006.01)
*C01B 3/50* (2006.01)
*C01B 4/00* (2006.01)
*H01M 4/94* (2006.01)
*H01M 8/06* (2006.01)

(52) U.S. Cl.
CPC ............. *B01D 65/00* (2013.01); *B01D 65/003* (2013.01); *B01D 71/022* (2013.01); *B01J 19/1893* (2013.01); *C01B 3/505* (2013.01); *C01B 4/00* (2013.01); *H01M 4/94* (2013.01); *B01D 2256/16* (2013.01); *B01D 2311/13* (2013.01); *B01D 2313/025* (2013.01); *B01D 2313/34* (2013.01); *B01J 2219/0254* (2013.01); *B01J 2219/0286* (2013.01); *C01B 2203/041* (2013.01); *H01M 8/0681* (2013.01); *H01M 8/0687* (2013.01); *Y02E 60/50* (2013.01)
USPC ........... 96/10; 96/4; 95/56; 422/187; 422/214

(56) References Cited

U.S. PATENT DOCUMENTS

| | | | | |
|---|---|---|---|---|
| 5,861,137 | A * | 1/1999 | Edlund | 422/218 |
| 6,200,541 | B1 * | 3/2001 | Kleefisch et al. | 422/211 |
| 6,558,544 | B1 * | 5/2003 | Eisberg et al. | 210/321.67 |
| 6,958,087 | B2 * | 10/2005 | Suzuki | 96/10 |
| 7,393,384 | B2 * | 7/2008 | Gopalan et al. | 95/56 |
| 8,163,064 | B2 * | 4/2012 | Bredesen et al. | 96/4 |
| 2004/0120889 | A1 | 6/2004 | Shah et al. | |

FOREIGN PATENT DOCUMENTS

| | | |
|---|---|---|
| GB | 1 050 890 | 12/1966 |
| GB | 1 477 131 | 6/1977 |

OTHER PUBLICATIONS

International Search Report dated Sep. 26, 2011, corresponding to PCT/IT2011/000205.

Tosti, et al.; "Mechanical Design of a PERMCAT reactor module"; vol. 82, No. 2; Jan. 10, 2007; pp. 153-161.

* cited by examiner

PRIOR ART

PRIOR ART

MEMBRANE REACTOR FOR TREATING GASES CONTAINING TRITIUM

This application is a Section 371 National Stage of International Application PCT/IT2011/000205 filed on Jun. 16, 2011, which claims priority of Italian patent application no. RM2010A000330, filed Jun. 16, 2010.

SUMMARY

The device according to the present invention basically consists of a membrane reactor that uses a tube made of palladium-silver alloy (permeator tube) that has the property of being selectively permeable to hydrogen and its isotopes. Said device has been devised for implementing an innovative process for recovery of tritium from materials (so-called "soft housekeeping waste", i.e., gloves, paper, etc.) coming from laboratories and plants where materials contaminated by tritium are handled.

In the membrane reactor described herein isotope exchange takes place between a tritiated gaseous current coming from the process of detritiation of "soft housekeeping waste" and a current of flushing hydrogen set in countercurrent. The invention envisages, in the basic configuration, the adoption of a tube made of palladium alloy closed at one end (according to a "finger-like" or "double-tube" scheme) and heated by the Joule effect by passage of current. Specifically, a device is provided, equipped with means capable of simultaneously applying a tensile stress on the permeator tube and enabling passage of the electric current for ohmic heating of the permeator tube itself.

A better understanding of the invention will be gleaned from the ensuing detailed description and with reference to the annexed figures, which illustrate, purely by way of non-limiting example, some preferred embodiments thereof.

Figure 5:
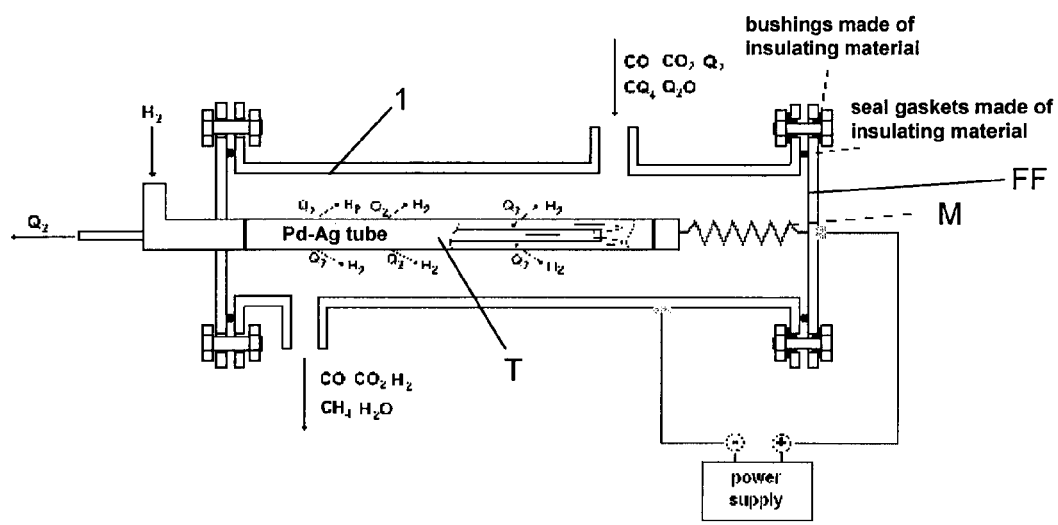
FIG. 5 is a longitudinal cross-sectional view of a membrane reactor according to the present invention.
Figure 6:
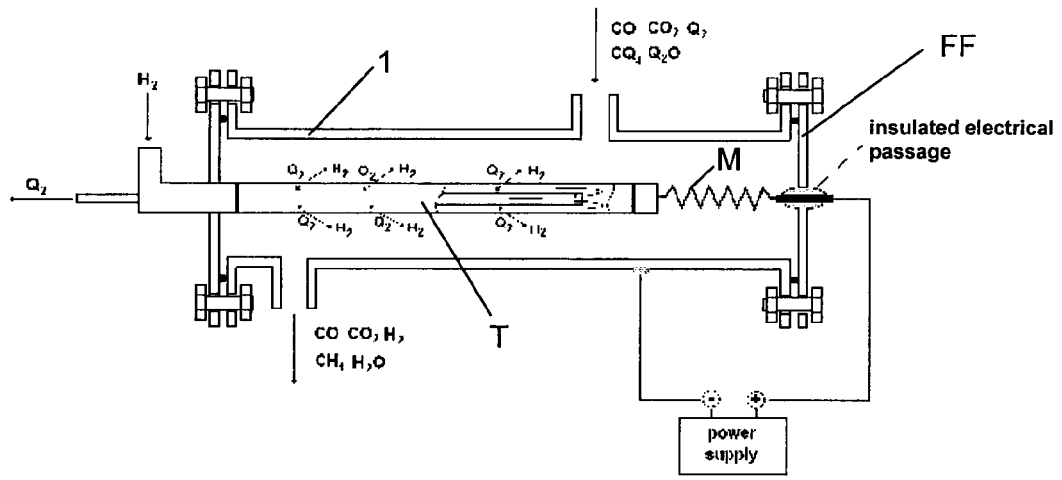
Figure 7:
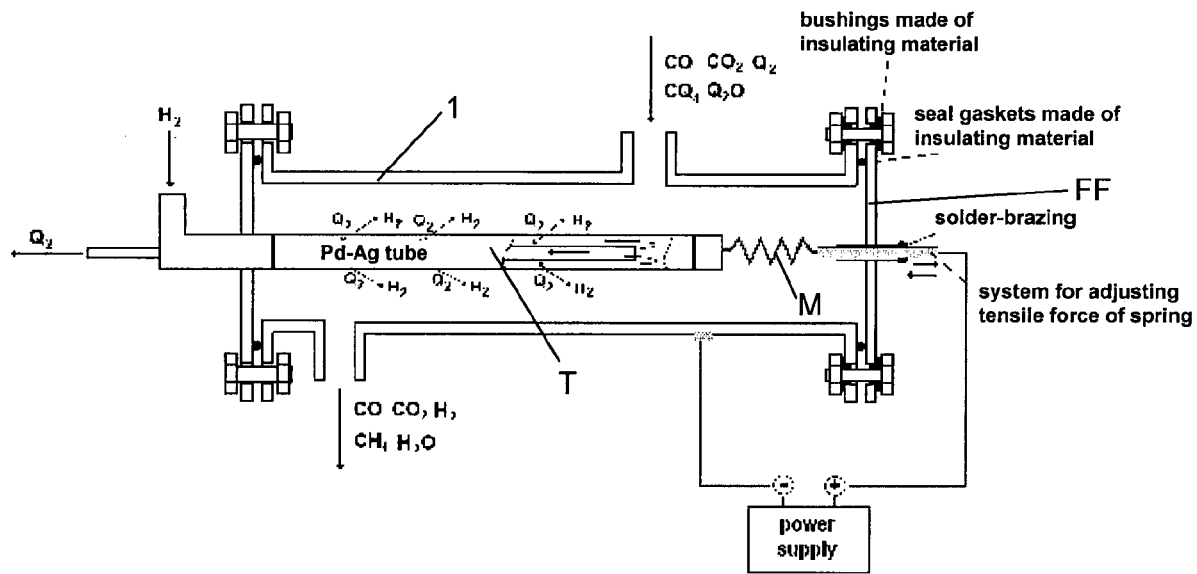
Figure 8:
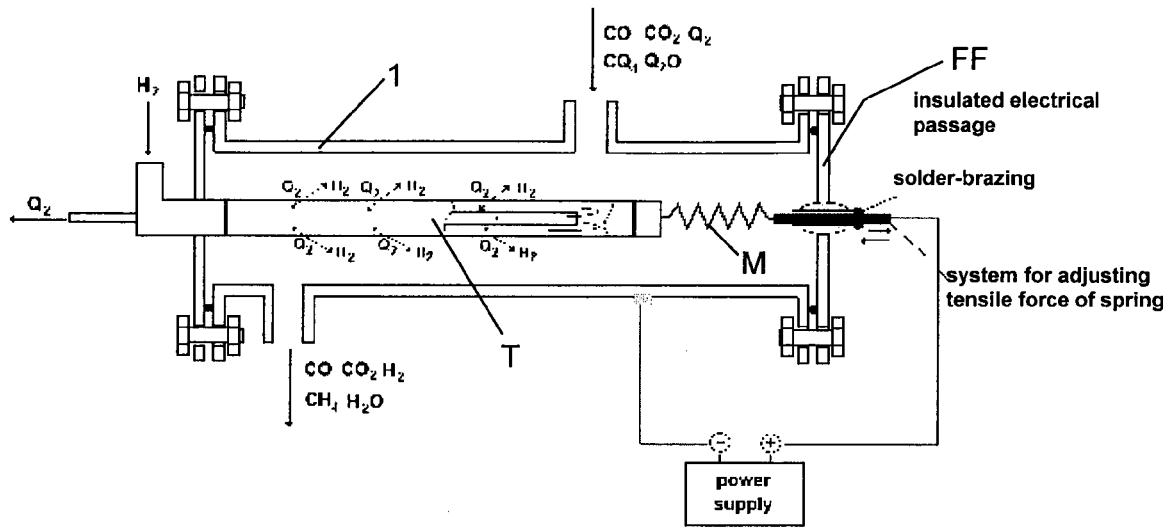
Figure 9:
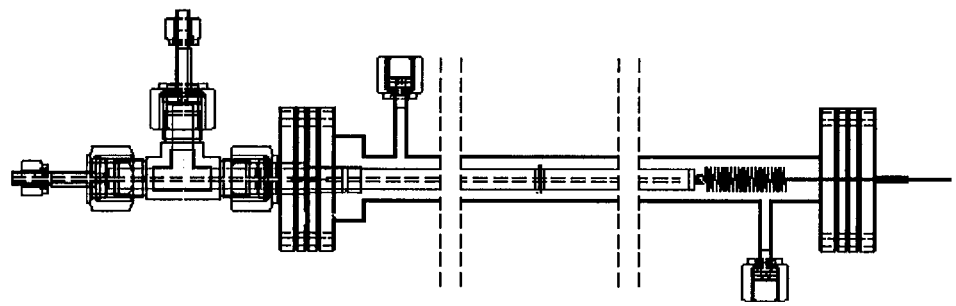
Figure 10:
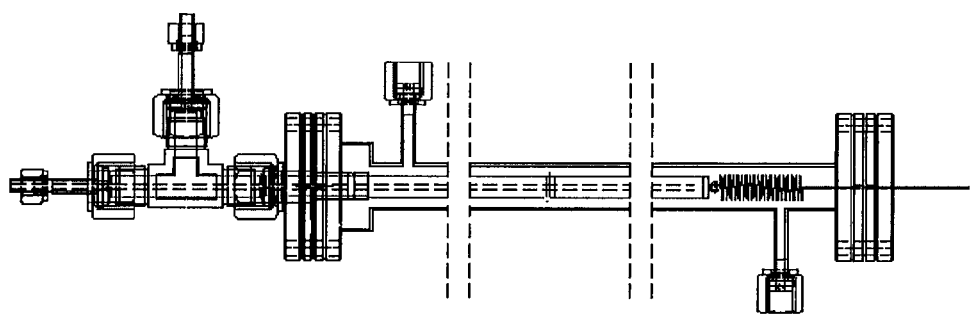

FIG. 6, which is similar to the previous one, shows a variant provided with insulated electrical passage on the end flange;

FIGS. 7 and 8, which are similar to the preceding FIGS. 5 and 6, respectively, regard a second embodiment of the invention, which envisages means for adjusting the tensile force applied by the spring on the permeator tube; and FIGS. 9 and 10 show two drawings of the reactor according to the invention, respectively for the case of end flange connected by means of electrically insulated gaskets and for the case of use of insulated electrical passage.

1. STATE OF THE ART

Figure 1:
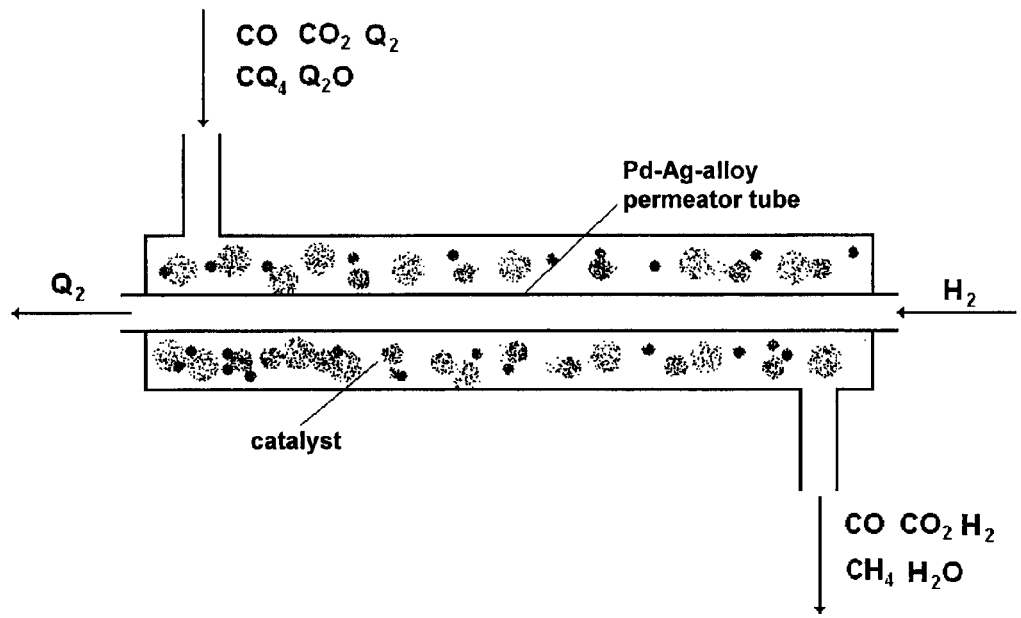
FIGS. 1-4 show apparatuses according to the known art.

To remove tritium from gaseous currents in applications studied for the fuel cycle of nuclear-fusion reactors [1, 2] there has been proposed a membrane reactor (PERMCAT) that uses permeator tubes made of palladium-silver alloy. In a first configuration of said known reactor, a current of hydrogen is sent into a tubular membrane made of palladium-silver alloy permeable selectively to hydrogen isotopes in countercurrent with respect to a gaseous current containing tritium and tritiated compounds (for example, tritiated water and methane in addition to $CO$, $CO_2$ and inert substances), which is sent onto a catalytic bed located in the shell of the reactor itself, as illustrated in FIG. 1, where the tritium is designated by the letter Q.

Figure 2:
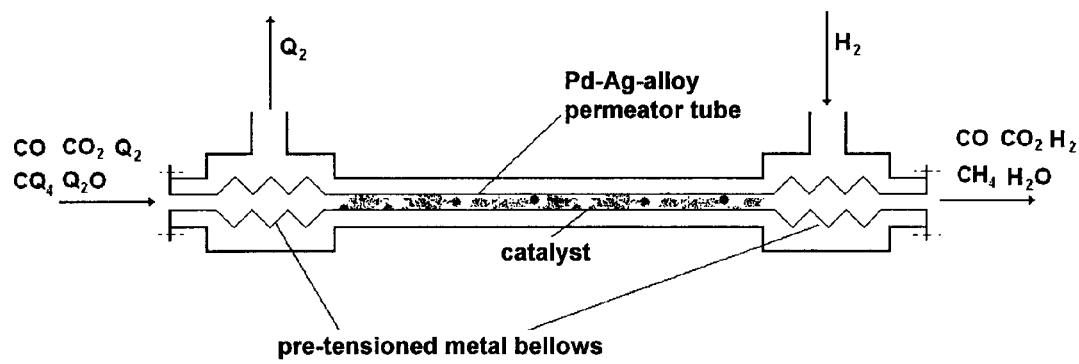

The Pd—Ag permeator tube used has a wall of a thickness of 0.100 mm and is characterized by a high length-to-diameter ratio (outer diameter of 3.3 mm and length of 500 mm). In general, this membrane reactor, which uses tubes made of palladium alloy, presents the drawbacks linked to the thermal cycles and hydrogenation/dehydrogenation cycles, which involve lengthening/contraction of the tubes themselves. Said deformations, if prevented or hindered by the reactor module, can produce mechanical stresses, including cyclic ones, capable of causing rapidly failure of the membrane with loss of the selectivity and hence of functionality of the device. To overcome these drawbacks, ENEA has studied in the past a particular configuration of membrane reactor in which a thin-walled (0.050 mm) permeator tube is used, characterized by higher flows of permeation of the hydrogen isotopes [3]. In this configuration, the palladium tube is connected in a fluid-tight way to the reactor module through two metal bellows capable of compensating the different deformations and, moreover, during the steps of installation said palladium tube is fixed by means of welding to the reactor module by tensioning the metal bellows, which are conveniently lengthened with respect to the resting position using an expansion device (FIG. 2). In this way, in the operating conditions the tubular membrane is subjected to an axial tensile stress compatible with the configuration and characteristics of the materials. However, the small wall thickness (0.050 mm) can lead to formation of defects (small holes or cracks) by abrasion or corrosion in the case of contact with the catalytic bed.

Figure 3:
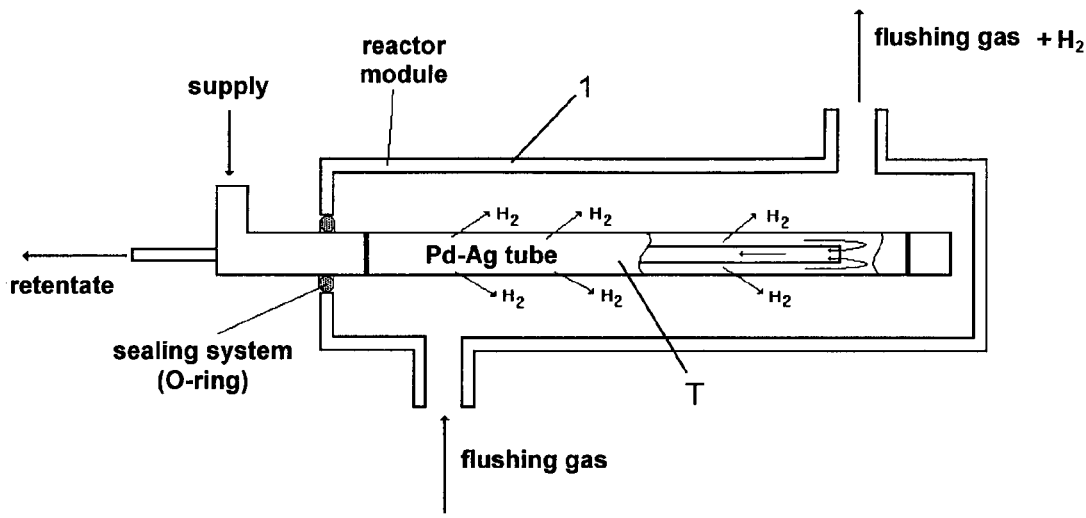

In other known applications, for example both for processes of detritiation and for reactions of dehydrogenation, membrane reactors have been studied in which the permeator tubes are fixed to the reactor module at just one end; this configuration is referred to as "finger-like" or "double-tube" configuration. In fact, the permeator tube is closed at one of its ends, while a smaller tube is inserted within the lumen for inlet of the supply or recovery of the retentate. For example, illustrated in FIG. 3 is the scheme of a membrane module that uses a Pd—Ag permeator tube in a finger-like configuration: hydrogen permeated through the membrane is gathered in the shell of the reactor by a flushing gas, whilst the retentate (non-permeated gas) is recovered through a steel tube of small diameter inserted in the lumen of the permeator tube.

Figure 4:
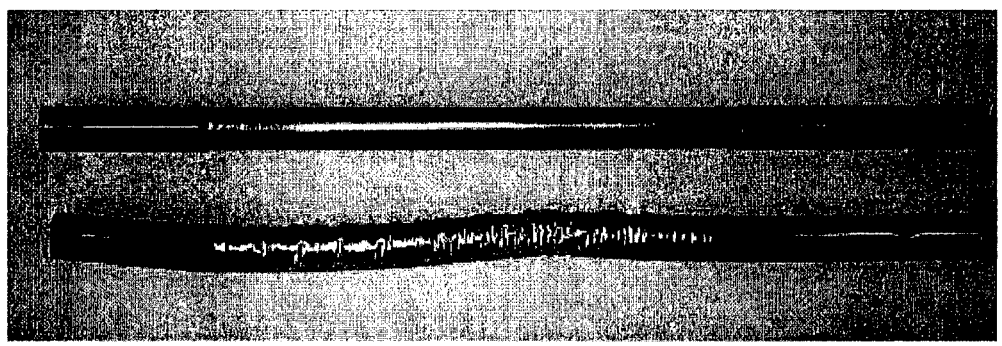

However, this known configuration, especially in the case of very long permeator tubes (i.e., in the case where high detritiation factors are required), presents the drawback of the contact and jamming of the permeator tube T with the internal walls of the membrane module 1 as a consequence of the deformations that the tube T itself undergoes as a result of the thermal cycles and hydrogenation cycles. In this regard, reference should be made to FIG. 4, where a permeator tube made of Pd—Ag alloy is illustrated before and after long-duration tests with thermal cycles and hydrogenation cycles.

Finally, ohmic heating of permeator tubes made of palladium alloy has been recently proposed in order to reduce the electric power necessary and prevent heating processed gaseous currents, where not necessary [4]. However, these devices require particular electrical passages through the walls of the reactor module and adequate systems for flexible connection of the permeator tube to the electrical passages themselves.

The main purpose of the present invention is to overcome the aforesaid problems by providing a membrane reactor as described in the ensuing claim 1, where a substantially cylindrical container referred to as "module" 1 is envisaged, which is made preferably made of steel but can be made also of other metals and other materials: for example, for laboratory applications, glass (e.g., Pyrex) is frequently preferred.

2. GENERAL DESCRIPTION OF THE INVENTION

The membrane reactor forming the subject of the present invention comprises at least one permeator tube T made of palladium-silver alloy (preferably with 23-25 wt % of Ag) having a wall thickness of approximately 0.050 mm to 0.200 mm. In the case of tubes having a wall thickness of approximately 0.050 mm, these are thin-walled tubes produced by means of rolling and subsequent diffusion welding [5]; in the case of tubes having a wall thickness of approximately 0.200 mm, these are commercially available tubes, which starts from thicknesses of approximately 100 μm.

It should be noted that the alloys commonly used for permeator tubes are palladium-based alloys, such as for example PdCu, but metal alloys with a base of Ni, Nb, V, Ta, Ti are also under study. The thicknesses of practical interest for said dense metal tubular membranes are substantially comprised in the range 50-200 μm, as mentioned previously.

The permeator tube T is housed in the module 1 in a finger-like configuration in which the two gas flows sent into the lumen and sent into the shell operate in countercurrent. Heating of the tube T to the process temperature, equal to approximately 300-400° C., is obtained by passage of electric current to obtain direct ohmic heating.

Provided according to a peculiar characteristic of the invention is a special device applied to the closed end of the permeator tube T, which basically consists of a preferably bi-metallic spring M that has two very distinct functions:

- applying to the permeator tube T a tensile load capable of preventing contact and jamming thereof with the internal walls of the membrane module 1 on account of the deformations that it undergoes as a result of the thermal cycles and of the dehydrogenation cycles; and
- guaranteeing electrical continuity between the closed free end of the permeator tube T and the outside of the membrane module 1 so as to enable heating by the Joule effect of the tube itself.

In the example embodiment described herein, to provide said mechanical-tensioning and electrical-connection device a spring M has been studied constituted by:

- a wire made of Inconel® (an alloy with mainly a base of nickel 48%-72% and chromium 14%-29%) capable of guaranteeing the required mechanical performance also at the working temperature, namely, a tensile load sufficient to guide the permeator tube T in a straight line along its longitudinal axis during its expansion; and
- a silver wire capable of guaranteeing the passage of electrical current with low resistance so as to prevent heating of the spring M itself and circumscribe heating by the Ohm effect on the permeator tube T.

Specifically, the mechanical stiffness of silver may be considered as negligible. Likewise, the passage of the electric current through the Inconel (and hence the corresponding heating by the Joule effect) is irrelevant as a consequence of the much greater conductivity of the silver wire, characterized by a lower resistivity and a cross section that is suitably greater than that of the Inconel wire.

FIGS. 5 and 6 illustrate a scheme of the invention, highlighted in which is the detail of the bi-metallic spring M for two variants:

a) electrical insulation of the end flange FF of the membrane module 1 by using a seal gasket of the flange itself made of an insulating organic material (silicone, Viton, Vespel, etc.) and special bushings once again made of insulating material for the bolts for tightening the flange (FIG. 5); and b) use of an insulated electrical passage through the end flange FF of the membrane module 1 (FIG. 6).

A second embodiment of the invention, illustrated in FIGS. 7 and 8, envisages means for adjusting the tensile force applied by the spring M to the permeator tube T.

Also here the two cases of electrical insulation of the end flange (FIG. 7) and of use of the insulated electrical passage (FIG. 8) are illustrated. More specifically, the tensile force applied by the spring M is regulated by actuation of a purposely provided adjustment rod that is finally blocked in a sealed way by means of solder-brazing directly to the end flange (FIG. 7) or to the insulated electrical passage (FIG. 8).

2.1 Sizing of the Bi-Metallic Spring

For the tests, sizing of the bi-metallic spring M was made on the basis of the mechanical characteristics (yield point) and of the electrical characteristics (resistivity) of the permeator tube T in the operating conditions in a temperature range of approximately 300-400° C. In particular, by way of example, the case of a tube of Pd—Ag of a diameter of 10 mm was considered with different values of wall thickness (0.050 and 0.200 mm) and of length (250 and 500 mm).

In order to prevent any excessive deformation of the permeator tube, also considering phenomena of "creep" at the working temperature of 300-400° C., the tensile load to be applied was fixed at approximately 5% of the ultimate tensile strength (UTS) referred to the temperature of 400° C. From the data provided in the literature [6, 7], for the Pd—Ag alloy (23-25 wt % of Ag) a UTS value of 280 MPa was calculated. Hence, the value of the tensile load applied by the spring M to the tube T, calculated at approximately 5% of the UTS, for a permeator tube having a wall thickness of 0.050 and 0.200 mm, is 20 and to 80 N, respectively.

In the ranges of temperature and in the conditions of hydrogenation considered already in previous works [8], the percentage variation of length estimated for the Pd—Ag tube was approximately 1.5%, which hence corresponds to an absolute variation of length of approximately 4 mm for the case of a permeator tube T having a total length of 250 mm and of approximately 8 mm for a tube T having a length of 500 mm.

Appearing in table I is the sizing of the Inconel part of the bi-metallic spring M. The number of turns was calculated in such a way that in the working conditions the variation of length of the spring M ("number of turns"×"deflection") is ten times greater than the absolute variation of length of the permeator tube T as a result of the thermal cycles and hydrogenation cycles. In this way, it was reasonably found that the variation of the tensile load applied by the spring M following upon lengthening/contraction of the permeator tube T is substantially negligible (i.e., approximately 10% of the load initially applied).

TABLE I

| wall thickness of permeator tube (mm) | length of permeator tube (mm) | tensile force of spring (N) | diameter of Inconel 718 wire (mm) | diameter of turn (mm) | number of turns | deflection (mm) |
| --- | --- | --- | --- | --- | --- | --- |
| 0.050 | 250 | 20 | 1 | 11 | 20 | 2 |
| 0.050 | 500 | 20 | 1 | 11 | 40 | 2 |
| 0.200 | 250 | 80 | 2 | 20 | 10 | 4 |
| 0.200 | 500 | 80 | 2 | 20 | 20 | 4 |

Sizing of the silver part of the bi-metallic spring M, for electrical conduction with a resistance that is as low as possible, was made considering that the silver wire has the same length as the Inconel wire (i.e., the silver wire and the Inconel wire are wound in a single coil to form the bi-metallic spring). It should moreover be considered that the electrical resistance of the silver part is sufficiently lower than the resistance of the permeator tube T: in particular, the resistance of the silver wire was fixed at 10% of the resistance of the Pd—Ag tube T, which was calculated assuming a value of resistivity of said alloy of $4 \times 10^{-7}$ Ωm. The values calculated for the diameter of the Ag wire are approximately $\psi = 1.5$ mm for the case of the permeator tube T with a wall thickness of 0.050 and $\psi = 3$ mm for the tube T with a wall thickness of 0.200 mm (see Table II).

TABLE II

| wall thickness of permeator tube (mm) | Length of permeator tube (mm) | Resistance of Pd—Ag tube (Ω) | resistance of Ag wire (Ω) | Length of Ag wire (mm) | diameter of Ag wire (mm) |
|---|---|---|---|---|---|
| 0.050 | 250 | $6.37 \times 10^{-2}$ | $6.37 \times 10^{-3}$ | 690.8 | 1.48 |
| 0.050 | 500 | $1.27 \times 10^{-1}$ | $1.27 \times 10^{-2}$ | 1381.6 | 1.48 |
| 0.200 | 250 | $1.59 \times 10^{-2}$ | $1.59 \times 10^{-3}$ | 628 | 2.83 |
| 0.200 | 500 | $3.18 \times 10^{-2}$ | $3.18 \times 10^{-3}$ | 1256 | 2.83 |

2.2 Examples of Reactors

For the application regarding the detritiation system of the JET (Joint European Torus) a reactor module 1 was designed comprising a Pd—Ag permeator tube T of a length of 250 mm, a diameter of 10 mm, and a wall thickness of 0.050 mm. In this case, the bi-metallic spring M was constituted by 20 turns of an Inconel wire of a diameter of 1 mm and a silver wire of a thickness of 1.5 mm. FIGS. 9 and 10 represent two drawings of the module 1 in question for the case of end flange FF connected by means of electrically insulated gaskets (FIG. 9) and for the case of use of an insulated electrical passage (FIG. 10). In either case there is envisaged use of the system for adjusting the tensile force constituted by a purposely provided rod that at the end of the operations of installation is fixed in a sealed way (solder-brazing, TIG welding, etc.) directly to the end flange FF or via the insulated electrical passage according to the cases.

Said module 1 also envisages the use of a thermocouple for detecting the temperature in the proximity of the central part of the permeator tube.

It should be noted that the bi-metallic spring M described herein is an object that can be implemented in different ways, provided that its dual function is guaranteed, namely, application of a tensile force and conduction of electricity.

For example, in addition to possibly being made up of two separate metal wires (an Inconel one and a silver one) wound in one and the same coil, it can be implemented also by providing two distinct coaxial springs one inside the other with different diameters, different pitch, etc., or else again it can be constituted by a single spring M made of a special material that has both of the required characteristics of good mechanical resistance at the working temperatures already indicated and high electrical conductivity.

It should be noted that the spring M described above, which is preferably bimetallic, is of great importance in order to guarantee that the deformations of the permeator tube T (lengthening and contraction consequent upon the thermal cycles and hydrogenation cycles) are guided in an axial direction by application of an appropriate tensile force.

It should be noted that the specific application of these devices, namely, membrane reactors that use permeator tubes T made of Pd—Ag alloy in finger-like configuration, i.e., set in cantilever fashion with their free end closed, requires that the annulus between the outside of the Pd—Ag tube T and the inside of the shell of the membrane module 1 is very small. In fact, the high level of effectiveness of operation of these devices expressed in terms of detritiation factor, i.e., the ratio between the concentration of tritium of the incoming and outgoing gases, is markedly dependent not only upon the kinetics of the reaction of isotope exchange that occurs on the catalytic bed, but also upon the kinetics of permeation of the hydrogen isotopes principally through the wall of the tubular membrane but also through the various gas films.

The kinetics of permeation is in turn determined by the resistance to transport of material of the hydrogen isotopes: in this sense, the presence of a gaseous layer of large thickness at the annulus between the permeator tube and the shell of the module gives rise to a gradient of the concentrations of the hydrogen isotopes that is responsible for the resistance to transport.

Hence, in order to obtain a high decontamination factor, it is precisely necessary to reduce as much as possible the annulus between the permeator tube T and the shell of the module 1. However, an annulus of small dimensions can cause in the case of a finger-like configuration and as a consequence of the thermal and dehydrogenation cycles contact and jamming of the permeator tube with the internal walls of the membrane module 1. For this purpose, for the specific application of the detritiation processes according to the invention and more in general for all those cases in which a high kinetics of permeation is required, a system capable of guiding in an axial direction the deformations of the permeator tube T obtained by applying an adequate tensile force on the permeator tube affords particular advantages.

3. APPLICATIONS

The device forming the subject of the present invention has been specifically devised for detritiation of gaseous currents coming from an oven for treatment of so-called "soft housekeeping waste" (i.e., gloves, paper, etc.) of laboratories.

More in general, the invention can be used in the treatment of plasma exhausts of magnetic-confinement experimental machines (for example JET and ITER—International Thermonuclear Experimental Reactor) or in all the processes for separation in gaseous phase of hydrogen isotopes (H, D, T) that use tubular membranes made of Pd—Ag alloy, for example, purification (detritiation) of gaseous currents, isotope separation or enrichment processes, etc.

However, the most important applications with reference to the potential market regard the production of membrane modules for purification of hydrogen and of membrane reactors for production of ultrapure hydrogen by means of dehydrogenation reactions. These applications can be aimed at systems that use fuel cells of a polymeric type (PEM fuel cells), at specific sectors of the chemical industry (fine chemistry, pharmaceutical sector), in addition to devices that produce ultrapure hydrogen for laboratory use.

In the various applications it may prove necessary to modify the dimensions of the objects described so far (lengths, diameters, type and volume of the catalyst, etc.) as likewise to provide devices containing a number of permeator tubes T or provide combinations in series or parallel of a number of membrane modules 1.

Finally, different modes of flushing of the gaseous currents may be envisaged.

In conclusion, the flow for supply of the membrane ($H_2$) may be sent through the steel tube of small diameter, and recovery of the retentate (current rich in $Q_2$) may be made through the permeator tube. Once again, the currents sent in the lumen may be exchanged with the ones sent in the shell of the module (i.e., the $H_2/Q_2$ current is sent into the shell of the reactor and the current $CH_4+CO+CO_2+H_2+H_2O/CQ_4+CO+CO_2+Q_2+Q_2O$ is sent into the lumen of the permeator tube).

Furthermore, the gaseous currents sent into the lumen and into the shell can operate in countercurrent or else in equicurrent (i.e., traverse the reactor in the same direction).

Finally, there may be envisaged the use and positioning of the catalyst inside or outside the permeator tube T.

4. REFERENCES

[1] M. Glugla, A. Perevezentsev, D. Niyongabo, R. D. Penzhorn, A. Bell, P. Hermann, A PERMCAT Reactor for Impurity Processing in the JET Active Gas Handling System, Fusion Engineering and Design 49-50 (2000) 817-823

[2] B. Bornschein, M. Glugla, K. Gunther, R. Lasser, T. L. Le, K. H. Simon, S. Welte, Tritium tests with a technical Permcat for final clean-up of ITER exhaust gases, Fusion Engineering and Design 69 (2003) 51-56

[3] S. Tosti, L. Bettinali, F. Marini, Dispositivo per la rimozione di trizio da correnti gassose, Italian Patent n. RM2005U000165 (14 Dec. 2005)

[4] S. Tosti, L. Bettinali, R. Borelli, D. Lecci, F. Marini, Dispositivo a membrana di permeazione per la purificazione di idrogeno, Italian Patent n. RM2009U000143 (15 Sep. 2009)

[5] S. Tosti, L. Bettinali, D. Lecci, F. Marini, V. Violante, Method of bonding thin foils made of metal alloys selectively permeable to hydrogen, particularly providing membrane devices, and apparatus for carrying out the same, European Patent EP 1184125 A1

[6] ASM Handbook, vol. 2, Properties and Selection: Nonferrous Alloys and Special-Purpose Materials, ASM International 1990, ISBN 0-87170-378-5 (v. 2)

[7] http://www.platinummetalsreview.com

[8] S. Tosti, L. Bettinali, F. Borgognoni, D. K. Murdoch, Mechanical design of a PERMCAT reactor module, Fusion Engineering and Design 82 (2007) 153-161

The invention claimed is:

1. An apparatus for recovery of tritium from contaminated gaseous mixtures by means of isotope-exchange processes, comprising:
   a container made of metal or glass that contains at least one permeator tube made of metal or metal alloy selectively permeable to hydrogen and its isotopes, wherein said tube is set in cantilever fashion with its closed end free; there being further provided means for applying an axial tensile force on the free end of the permeator tube and means for electrical connection of said free end of the tube itself to an end flange of the container adjacent thereto.

2. The apparatus according to claim 1, characterized in that:
   the container is closed at the two ends by means of seal flanges;
   the permeator tube is made of Pd—Ag alloy and is fixed by brazing or welding to a first flange of the container;
   the permeator tube is closed at one end, and recovery of the retentate is carried out by means of a further tube of small diameter set in the lumen of the permeator itself, in finger-like configuration;
   the closed end of the permeator tube made of Pd—Ag is connected to a second flange of the container by means of a spring designed to apply an axial tensile force and to provide passage of electric current; and
   the second flange is fixed to the container by means of a gasket made of electrically insulating material and bushings for the bolts for fastening the flange made of electrically insulating material.

3. The apparatus according to claim 1, characterized in that said means for applying an axial tensile force and for enabling passage of current are constituted by a spring connected by means of an insulated electrical passage to the second end flange, which is provided with metal gaskets and does not require bushings made of electrically insulating material.

4. The apparatus according to claim 2, characterized in that it further comprises means for adjusting the tensile force applied by the spring provided with an adjustment rod, designed to be blocked in a sealed way by means of braze welding.

5. The apparatus according to claim 1, characterized in that the permeator tube consists of a tube made of Pd—Ag metal alloy.

6. The apparatus according to claim 1, characterized in that said means for applying an axial tensile force and for enabling passage of current are constituted by a bimetal spring made of nickel chromium alloy and silver.

7. The apparatus according to claim 1, characterized in that said means for applying an axial tensile force and for enabling passage of current are constituted by:
   a spring obtained by means of two wires of different materials wound in one and the same spiral;
   or else
   two coaxial distinct springs: one for applying the tensile force, and the other for setting up the low-resistance electrical connection.

8. The apparatus according to claim 3, characterized in that it further comprises means for adjusting the tensile force applied by the spring provided with an adjustment rod, designed to be blocked in a sealed way by means of braze welding.

9. The apparatus according to claim 1, wherein the container is a cylindrical steel container.

10. The apparatus according to claim 2, wherein the tube of smaller diameter is made of steel.

* * * * *